United States Patent
Wen et al.

(10) Patent No.: US 9,794,177 B2
(45) Date of Patent: Oct. 17, 2017

(54) GATEWAY, SYSTEM AND METHOD FOR MULTIPLE RADIO ACCESS TECHNOLOGY SERVICE

(71) Applicant: Industrial Technology Research Institute, Chutung Chen, Hsinchu Hsien (TW)

(72) Inventors: Kuo-Wei Wen, Hsinchu (TW); Chien-Ming Lai, Hsinchu (TW); Chai-Hien Gan, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 183 days.

(21) Appl. No.: 14/978,855

(22) Filed: Dec. 22, 2015

(65) Prior Publication Data

US 2017/0111276 A1     Apr. 20, 2017

(30) Foreign Application Priority Data

Oct. 14, 2015   (TW) .............................. 104133657 A

(51) Int. Cl.
*H04L 1/00*     (2006.01)
*H04L 12/741*   (2013.01)
(Continued)

(52) U.S. Cl.
CPC ........ *H04L 45/745* (2013.01); *H04L 61/2592* (2013.01); *H04L 69/16* (2013.01);
(Continued)

(58) Field of Classification Search
CPC ........... H04J 14/0267; H04J 2203/0023; H04J 2203/0053; H04L 12/5689; H04L 45/00;
(Continued)

(56) References Cited

U.S. PATENT DOCUMENTS 6,791,956 B1 * 9/2004 Leu .................. H04W 4/18
                                                    370/328
8,726,007 B2 * 5/2014 Chandrika .......... H04L 12/4633
                                                    370/389
(Continued)

FOREIGN PATENT DOCUMENTS

CN         103718497 A    4/2014
TW         I377813 B      11/2012

OTHER PUBLICATIONS

Ahsan Kazmi et al, "Concurrent Multipath Transfer in Fi-Wi Access Networks", Optical Networks and Enabling Technologies (HONET-CNS), 2013, IEEE, pp. 209-213.
(Continued)

*Primary Examiner* — Dady Chery
(74) *Attorney, Agent, or Firm* — Birch, Stewart, Kolasch & Birch, LLP

(57) ABSTRACT

A gateway, system and method for multiple radio access technology service are provided. The gateway is between base stations and a core network, including a receiving module, determining module and processing module. The receiving module receives a packet from the base stations or the core network through a tunnel between the base stations and the core network. The determining module determines whether the packet has a virtual IP header. If the packet has a virtual IP header, the processing module deletes the virtual IP header and replaces it with a tunnel header to transmit the packet to the core network through the tunnel by the tunnel header. If the packet has no virtual IP header, the processing module forwards the packet to the core network through the tunnel. The disclosure enhances transmitting and processing performance of the packet when the packet is transmitted through only a single tunnel.

15 Claims, 8 Drawing Sheets

(51) Int. Cl.
  *H04L 29/12* (2006.01)
  *H04L 29/06* (2006.01)
  *H04W 28/06* (2009.01)
  *H04W 72/04* (2009.01)

(52) U.S. Cl.
  CPC ............. *H04L 69/22* (2013.01); *H04W 28/06* (2013.01); *H04W 72/04* (2013.01)

(58) Field of Classification Search
  CPC ......... H04L 45/10; H04L 45/22; H04L 49/25; H04L 49/256; H04L 12/5601; H04L 49/101; H04M 2215/42; H04W 40/00; H04W 40/02; H04Q 11/0478
  USPC ....... 370/229, 230, 310, 252, 348, 351, 341, 370/355, 356, 390, 391, 392
  See application file for complete search history.

(56) References Cited

U.S. PATENT DOCUMENTS

| | | | |
|---|---|---|---|
| 8,767,625 | B2 | 7/2014 | Krishnaswamy et al. |
| 8,848,640 | B2 | 9/2014 | Reznik et al. |
| 2005/0207421 | A1* | 9/2005 | Suzuki ............. H04L 29/12254 370/392 |
| 2007/0223448 | A1* | 9/2007 | Tanazawa ............... H04L 45/60 370/351 |
| 2012/0230268 | A1 | 9/2012 | Marinier et al. |
| 2013/0021968 | A1 | 1/2013 | Reznik et al. |
| 2014/0105139 | A1 | 4/2014 | Tomici et al. |

OTHER PUBLICATIONS

Kojima et al., "LTE-WiFi Link Aggregation at Femtocell Base Station", Proceedings of the World Telecommunications Congress, Berlin, Germany; Jun. 2014; pp. 1-6.

Krishna et al., "A Dynamic Link Aggregation Scheme for Heterogeneous Wireless Networks" Electronics, Computing and Communication Technologies (IEEE CONECCT), 2014, pp. 1-6.

Ogi et al., "Design and Implementation of Mobility Mechanisms for Mobile IPv6-based Link Aggregation System", Proceedings of the 2005 Symposium on Applications and the Internet Workshops, 2005, pp. 72-75.

Scharf et al., "MCTCP: A Multipath Transport Shim Layer", Global Telecommunications Conference (GLOBECOM 2011), 2011, IEEE, pp. 1-5.

Taniguchi et al., "Packet Allocation for Efficient Use of Multiple Wireless Links in Cognitive Radio Networks", Global-Information Infrastructure Symposium, 2007, IEEE, pp. 27-34.

* cited by examiner

GATEWAY, SYSTEM AND METHOD FOR MULTIPLE RADIO ACCESS TECHNOLOGY SERVICE

CROSS-REFERENCE TO RELATED APPLICATIONS

This application claims priority to Taiwanese Application Serial No. 104133657, filed on Oct. 14, 2015. The entirety of the above-mentioned patent application is hereby incorporated by reference herein and made a part of this specification.

TECHNICAL FIELD

The present disclosure relates to a gateway, a system and a method for multiple radio access technology (Multi-RAT) service.

BACKGROUND

Any existing user apparatus (such as a mobile device) is usually equipped with a multiple or heterogeneous radio access interface, such as a Wi-Fi (wireless network) interface and a Long Term Evolution (LTE) interface and the like. Thus, a gateway for Multiple Radio Access Technology (Multi-RAT) service provided between base stations and a core network provides multiple network bandwidth aggregation service to improve network transmission speed. However, this is bound to affect the original communication protocols or connection mechanisms.

In the conventional art, in order to provide the Multi-RAT service the Internet Protocol (IP) address of the Multi-RAT gateway must be set in a small-cell base station or an access-point base station. For a user apparatus capable of Multi-RAT service, two segments of tunnel have to be established between the base station and the core network. For example, a first segment of the tunnel is between the small cell (or an access point) base station and the gateway, and a second segment of the tunnel is between the gateway and the core network. However, in this scenario all packets coming from the user apparatus will have to be transmitted to the core network through the two-segment tunnel by activating the gateway to provide additional services, thus delaying the processing performance and transmission speed of the packets of the user apparatus.

SUMMARY

The present disclosure provides a gateway for multiple radio access technology (Multi-RAT) service, which includes: a receiving module for receiving a packet from base stations or a core network through a tunnel between the base stations and the core network; a determining module for determining whether a packet from the base stations has a virtual Internet Protocol (IP) header and determining whether a packet to be forwarded to the base stations needs to be appended with a virtual IP header; and a processing module for deleting the virtual IP header from the packet and replacing it with a tunnel header when the determining module determines that the packet has a virtual IP header, so as to transmit the packet to the core network through the tunnel by the tunnel header, forwarding the packet to the core network through the tunnel when the determining module determines that the packet has no virtual IP header, appending a virtual IP header to a packet by searching a connection mapping table when the determining module determines that the packet needs to be appended with the virtual IP header and forwarding the packet appended with the virtual IP header to the base stations, or forwarding a packet to the base stations when the determining module determines that the packet does not need a virtual IP header to be appended therewith.

The present disclosure provides a system for multiple radio access technology (Multi-RAT) service, which includes: a plurality of base stations; a core network; and a gateway for the Multi-RAT service, wherein the gateway is between the base stations and the core network, and includes: a receiving module for receiving a packet from the base stations or the core network through a tunnel between the base stations and the core network; a determining module for determining whether a packet from the base stations has a virtual Internet Protocol (IP) header and determining whether a packet to be forwarded to the base stations needs to be appended with a virtual IP header; and a processing module for deleting the virtual IP header from the packet and replacing it with a tunnel header when the determining module determines that the packet has a virtual IP header, so as to transmit the packet to the core network through the tunnel by the tunnel header, forwarding the packet to the core network through the tunnel when the determining module determines that the packet has no virtual IP header, appending a virtual IP header to a packet by searching a connection mapping table when the determining module determines that the packet needs to be appended with the virtual IP header and forwarding the packet appended with the virtual IP header to the base stations, or forwarding a packet to the base stations when the determining module determines that the packet does not need a virtual IP header to be appended therewith.

The present disclosure provides a method for multiple radio access technology (Multi-RAT) service, which includes: providing a plurality of base stations, a core network, and a gateway for the Multi-RAT service between the base stations and the core network; establishing a tunnel between the base stations and the core network during an access process between a user apparatus and the core network; allowing the gateway to receive a packet from the base stations or the core network via the tunnel; allowing the gateway to determine whether a packet from the base stations contains a virtual Internet Protocol (IP) header, and determine whether a packet to be forwarded to the base stations needs to be appended with a virtual IP header; and deleting, by the gateway, the virtual IP header from the packet and replacing it with a tunnel header when the packet is found to contain a virtual IP header, so as to transmit the packet to the core network through the tunnel by the tunnel header, forwarding, by the gateway, the packet to the core network through the tunnel when the packet is found to contain no virtual IP header, appending, by the gateway, a virtual IP header to a packet by searching a connection mapping table when it is determined that the packet needs to be appended with the virtual IP header and forwarding the packet appended with the virtual IP header to the base stations, or forwarding, by the gateway, a packet to the base stations when it is determined that the packet does not need a virtual IP header to be appended therewith.

BRIEF DESCRIPTION OF DRAWINGS

The present disclosure can be more fully understood by reading the following detailed descriptions of the preferred embodiments, with reference made to the accompanying drawings, wherein.

DETAILED DESCRIPTION

The present disclosure is described by the following specific embodiments. Those with ordinary skills in the arts can readily understand other advantages and functions of the present disclosure after reading the disclosure of this specification. The present disclosure may also be practiced or applied with other different implementations. Based on different contexts and applications, the various details in this specification can be modified and changed without departing from the spirit of the present disclosure.

Figure 1:
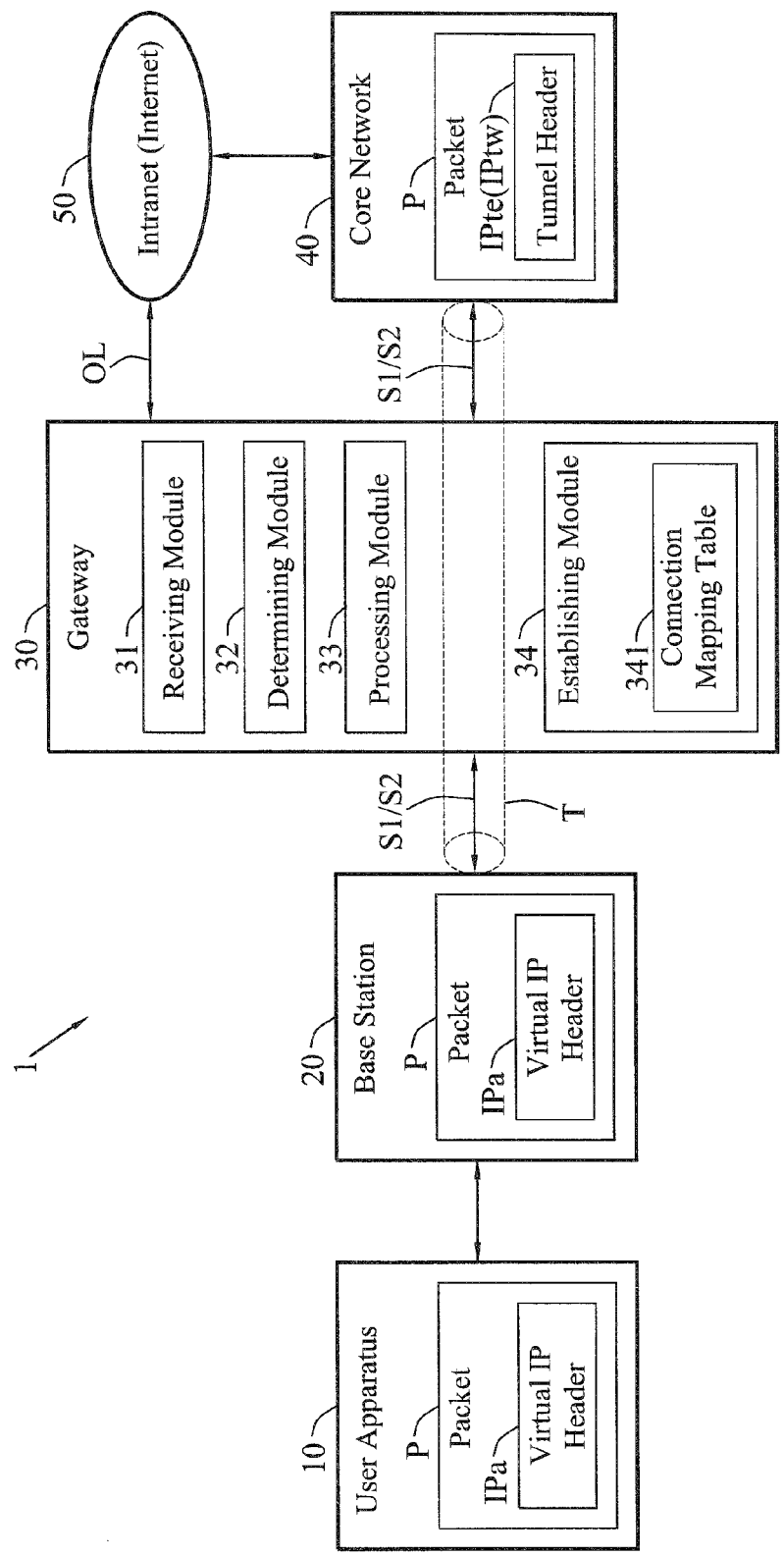
FIG. 1 is a schematic diagram of a system and a gateway for Multiple Radio Access Technology (Multi-RAT) service in accordance with the present disclosure.

FIG. 1 is a schematic diagram depicting a system 1 and a gateway 30 for Multiple Radio Access Technology (Multi-RAT) service in accordance with the present disclosure. The system 1 includes at least a base station 20, the gateway 30 and a core network 40, and can be connected to an intranet/Internet 50. Further, the base station 20 and the core network 40 communicate with each other by using the IP addresses of the respective parties in order to maintain the original communication protocols or connection mechanisms of connections between various network interfaces (e.g., Wi-Fi interfaces and LTE interfaces).

The gateway 30 is provided between the base station 20 and the core network 40. The gateway 30 includes a receiving module 31, a determining module 32 and a processing module 33. The receiving module 31 receives a packet P from the base station 20 or the core network 40 through a tunnel T between the base station 20 and the core network 40. The determining module 32 determines whether the packet P from the base station 20 has a virtual IP header (IP address) IPa, and determines whether a packet to be forwarded to the base stations 20 needs to be appended with a virtual IP header. If the determining module 32 determines that the packet P has a virtual IP header IPa, the processing module 33 deletes the virtual IP header IPa from the packet P, and replaces it with a tunnel header (IP address) IPte (or IPtw), so as to transmit the packet P to the core network 40 through the tunnel T by the tunnel header IPte (or IPtw). If the determining module 32 determines that the packet P does not have a virtual IP header IPa, the processing module 33 forwards the packet P to the core network 40 through the tunnel T. If the determining module 32 determines that the packet to be forwarded to the base stations 20 needs to be appended with a virtual IP header, the processing module 33 appends a virtual IP header to the packet by searching a connection mapping table 341 (see FIG. 3), and forwards the packet appended with the virtual IP header to the base stations 20. If the determining module 32 determines that the packet to be forwarded to the base stations 20 does not need a virtual IP header to be appended therewith, the processing module 33 forwards the packet to the base stations 20.

The gateway 30 can further include an establishing module 34 for establishing a connection mapping table 341 (see FIG. 3) including the virtual IP header IPa and an outgoing interface of the packet P, such that the gateway 30 is able to search the connection mapping table 341 for the outgoing interface of the packet P, for example, an S1 interface, an S2 interface, or an Offload interface (OL) etc.

Figure 4A:
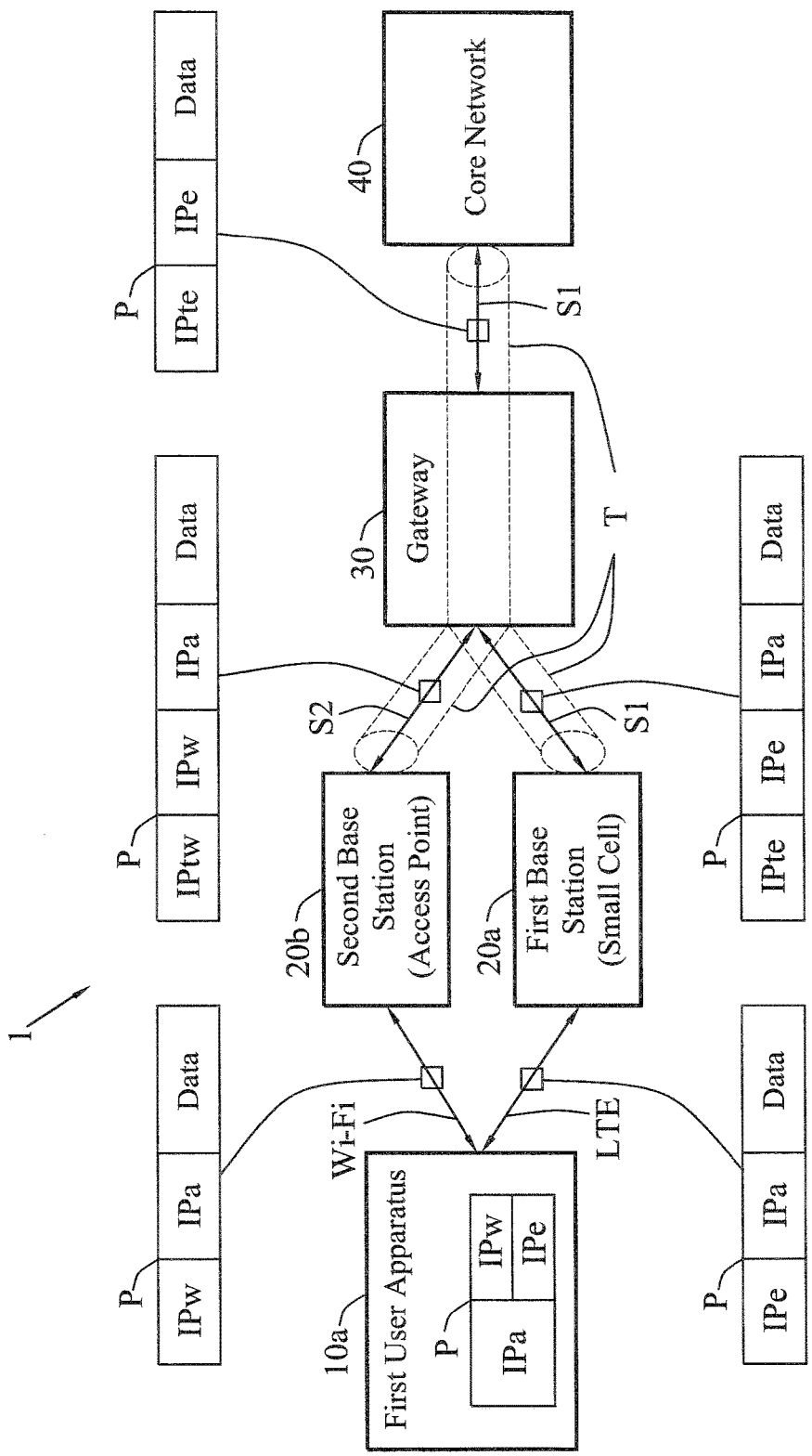
FIGS. 4A to 4C are schematic diagrams depicting the system and a method for Multi-RAT service in accordance with a first embodiment, a second embodiment, and a third embodiment of the present disclosure, respectively, wherein the user apparatus supports Multi-RAT service.

When the gateway 30 determines from the connection mapping table 341 that the outgoing interface of the packet P is the S1 interface, the processing module 33 of the gateway 30 deletes the virtual IP header IPa from the packet P and replaces it with the tunnel header IPte, so as to transmit the packet P to the core network 40 through the tunnel T of the S1 interface by the tunnel header IPte (see FIG. 4A).

Figure 4B:
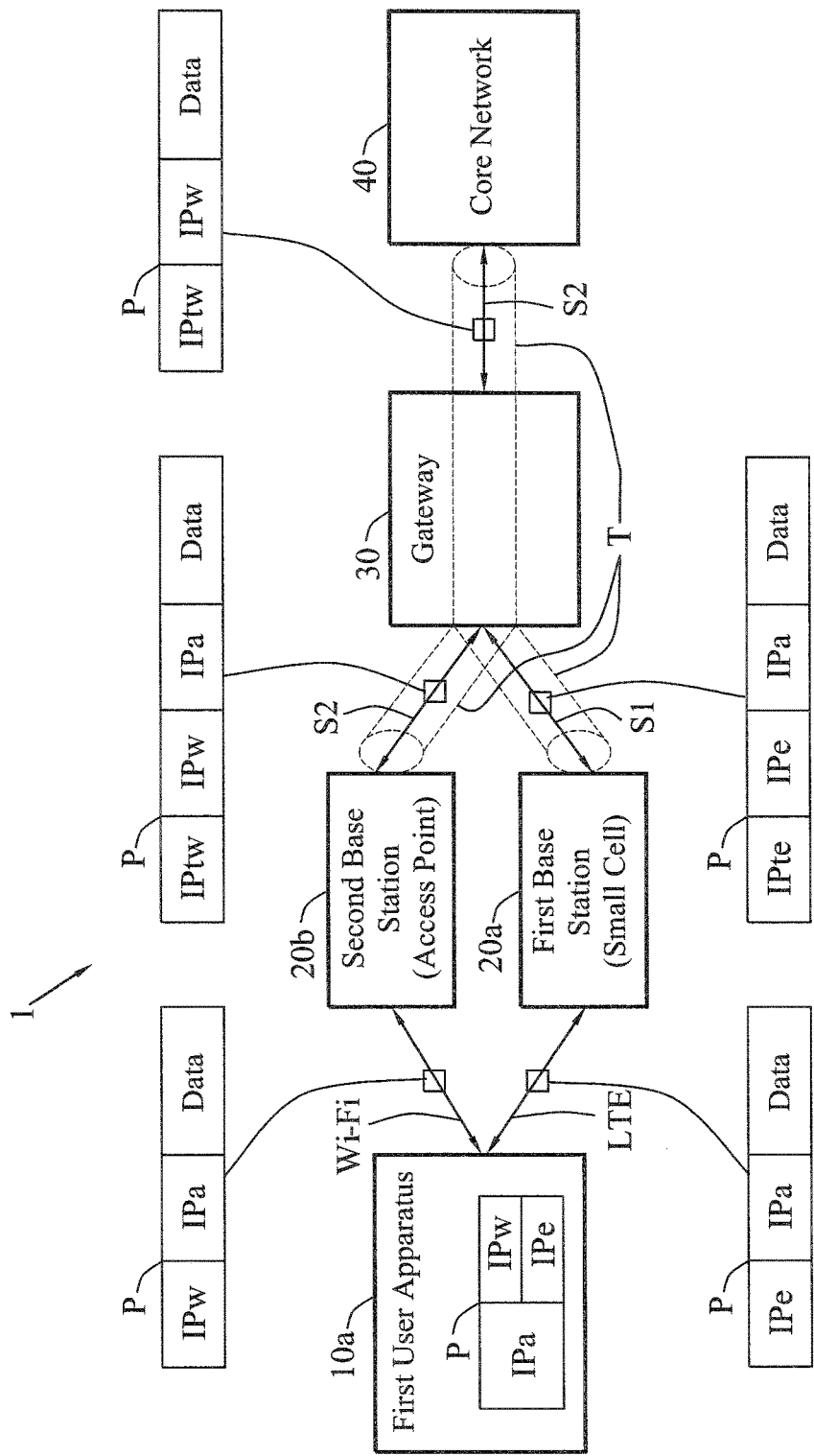

Alternatively, when the gateway 30 determines from the connection mapping table 341 that the outgoing interface of the packet P is the S2 interface, the processing module 33 of the gateway 30 deletes the virtual IP header IPa from the packet P and replaces it with the tunnel header IPtw, so as to transmit the packet P to the core network 40 through the tunnel T of the S2 interface by the tunnel header IPtw (see FIG. 4B).

Figure 4C:
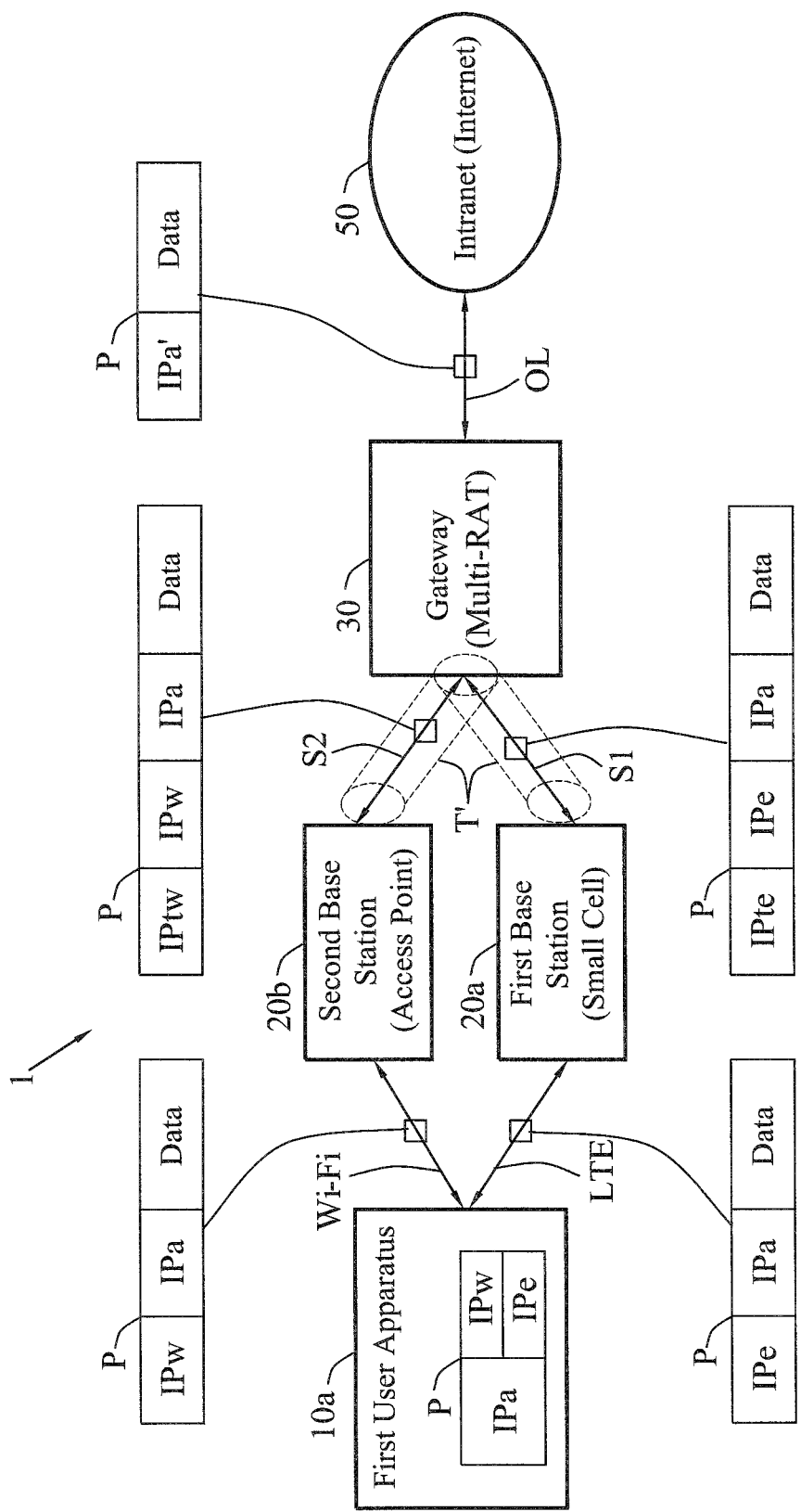

Alternatively, when the gateway 30 determines from the connection mapping table 341 that the outgoing interface of the packet P is the OL, the processing module 33 of the gateway 30 deletes the virtual IP header IPa from the packet P and replaces it with an Offload header (IP address) IPa' (FIG. 4C), so as to transmit the packet P to the intranet/Internet 50 through the OL by the Offload header IPa' (see FIG. 4C).

Moreover, the system 1 includes a user apparatus 10 for Multi-RAT service. The user apparatus 10 transmits the packet P to the base station 20 according to a radio access header (IP address) IPe (or IPw) of the packet P. The base station 20 then appends the tunnel header IPte (or IPtw) of the S1 interface (or S2 interface) to the packet P (see FIGS. 4A to 4C).

Alternatively, the system 1 includes a user apparatus 10 for Single-RAT service. The user apparatus 10 transmits the packet P to the base station 20. The base station 20 then appends the tunnel header IPte (or IPtw) of the S1 interface (or S2 interface) to the packet P (see FIGS. 4D to 4E).

Figure 2:
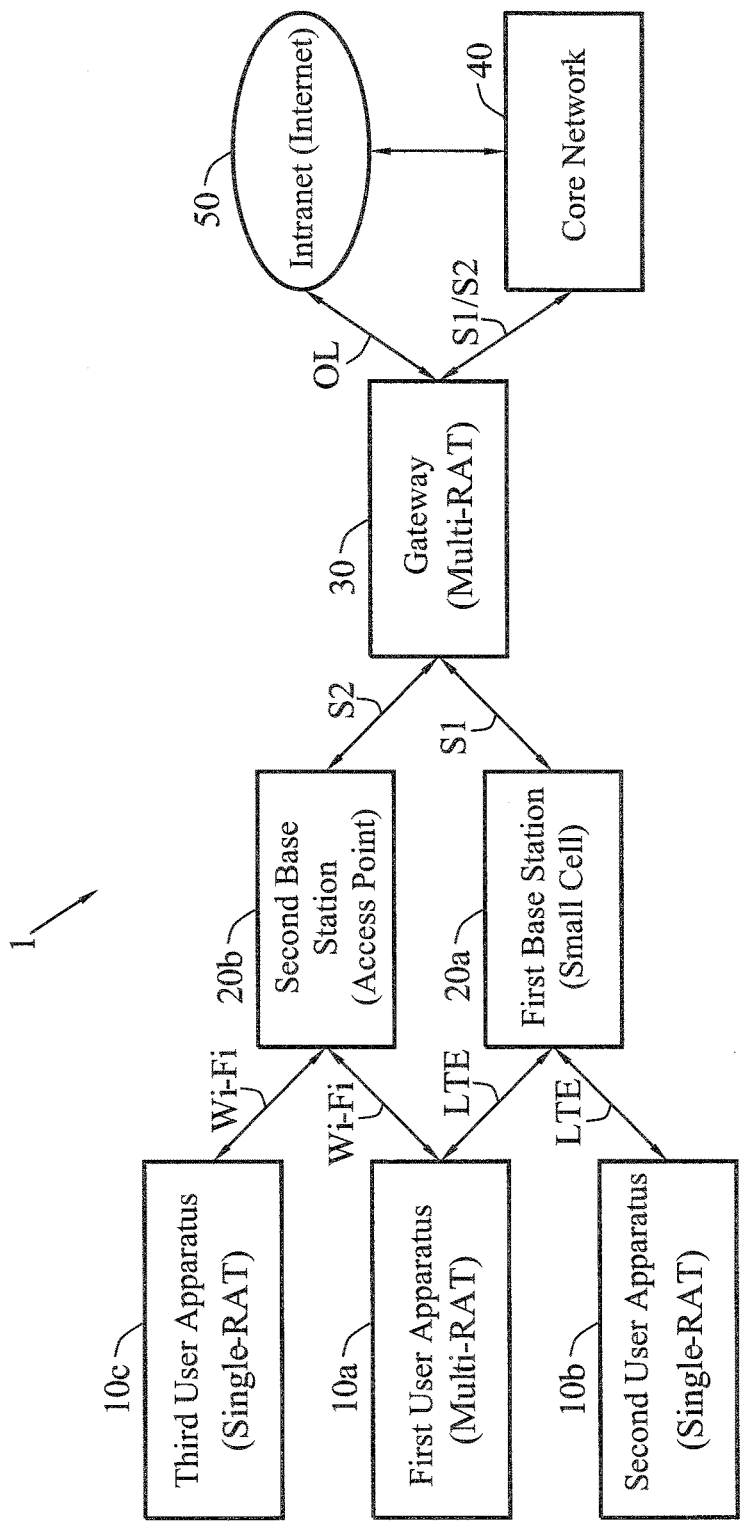
FIG. 2 is a schematic diagram depicting an implementation of the system and the gateway for Multi-RAT service in accordance with the present disclosure.

FIG. 2 is a schematic diagram depicting an implementation of the system 1 and the gateway 30 for Multi-RAT service in accordance with the present disclosure. Please refer to FIG. 2 in conjunction with FIG. 1. The user apparatus 10 can be a first user apparatus 10a supporting Multi-RAT service, or a second user apparatus 10b or a third user apparatus 10c supporting Single-RAT service. The user apparatus 10 can be a mobile device (e.g., a mobile phone or smartphone) or a portable computer (e.g., a tablet) or the like. The base station 20 can be a first base station 20a of a small cell, or a second base station 20b of an Access Point (AP). The core network 40 can be, but not limited to a Mobility Management Entity (MME), a mobile Switching Center (MSC), a Media Gateway (MGW), a Serving Gateway (S-GW), a Packet Data Network (PDN) gateway (P-GW), a Serving General Packet Radio Service (GPRS) Support Node (SGSN), a Gateway GPRS Support Node (GGSN) Operation and Maintenance (O & M) system, a proxy server, or independent functional entity, etc.

The first user apparatus 10a is capable of transmitting the packet P to the first base station 20a (or the second base station 20*b*) via one of two radio access interfaces (e.g., the LTE interface or the Wi-Fi interface), such that the first base station 20*a* (or the second base station 20*b*) transmits the packet P to the gateway 30 via the tunnel T of the S1 interface (or the S2 interface) for bandwidth aggregation. Then, the gateway 30 searches the connection mapping table 341 for the outgoing interface later, as shown in FIG. 3, and transmits the packet P to the core network 40 via the tunnel T of the S1 interface (or the S2 interface), or transmits the packet P to the intranet/Internet 50 via the Offload interface (OL) (see FIGS. 4A to 4C).

Figure 4D:
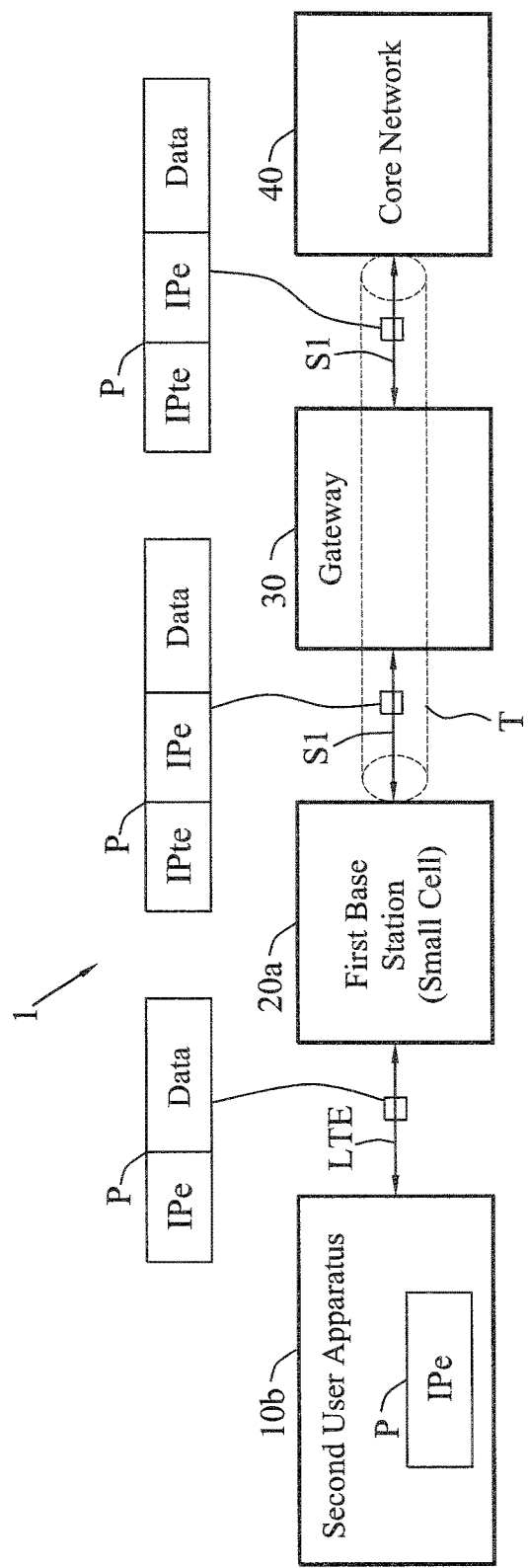
FIGS. 4D and 4E are schematic diagrams depicting the system and a method for Multi-RAT service in accordance with a fourth embodiment and a fifth embodiment of the present disclosure, respectively, wherein the user apparatus supports Single-RAT service.
Figure 4E:
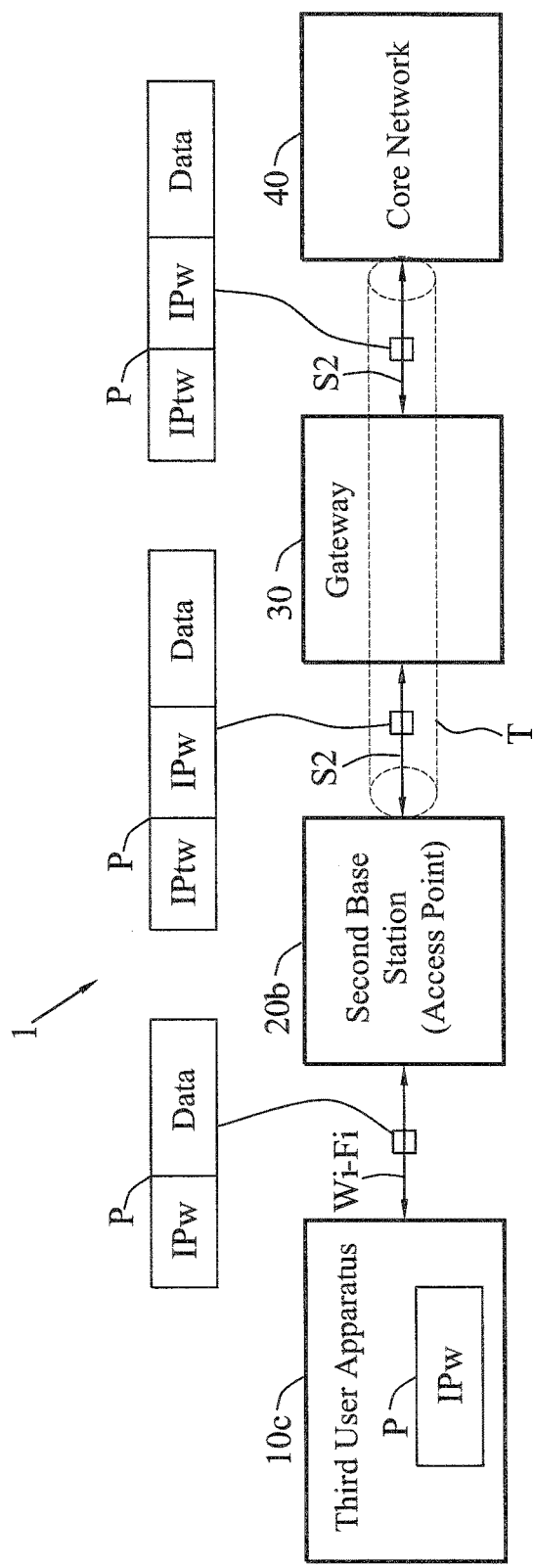

Furthermore, the second user apparatus 10*b* (or the third user apparatus 10*c*) transmits the packet P to the first base station 20*a* (or the second base station 20*b*) via only one radio access interface (e.g., the LTE interface or the Wi-Fi interface), such that the first base station 20*a* (or the second base station 20*b*) forwards the packet P to the core network 40 via the S1 interface (or the S2 interface) (see FIGS. 4D to 4E).

Figure 3:
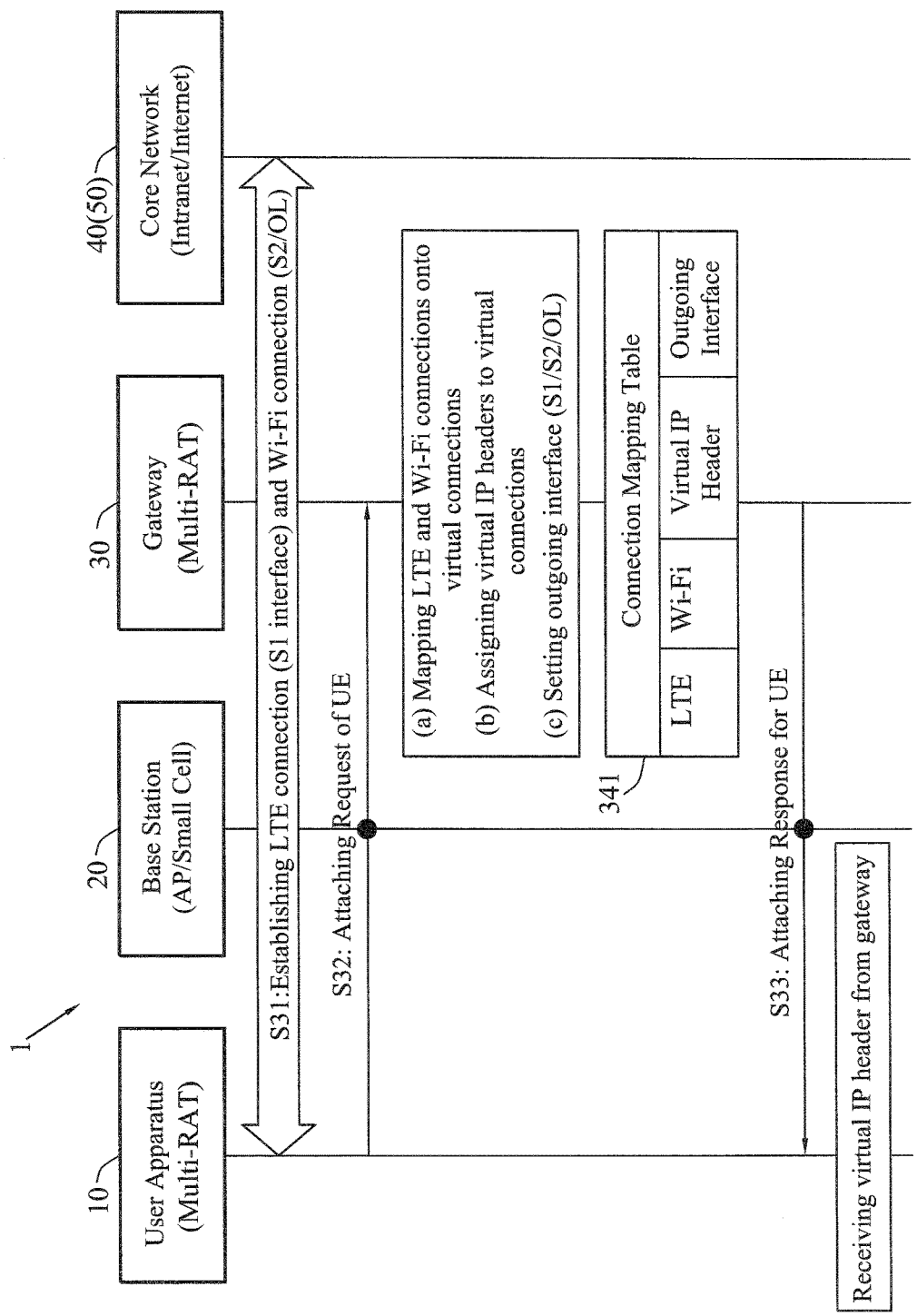
FIG. 3 is a sequence diagram illustrating the system for Multi-RAT service in accordance with the present disclosure.

FIG. 3 is a sequence diagram illustrating the system 1 for Multi-RAT service in accordance with the present disclosure. Refer to FIG. 3 in conjunction with FIGS. 1 and 2. In step S31 of FIG. 3, an LTE connection (for S1 interface) and a Wi-Fi connection (for S2 interface or OL) are established among the user apparatus 10 (first user apparatus 10*a*), the base station 20, the gateway 30, the core network 40, and the intranet/Internet 50.

Then, in step S32 of FIG. 3 the user apparatus 10 transmits its "Attach Request" to the gateway 30 via the base station 20. Thereafter, the gateway 30 maps the connection of LTE interface and the Wi-Fi interface onto a virtual connection, assigns a virtual IP header IPa to the virtual connection, and sets the outgoing interface of the packet P of the container 10 (e.g., the S1 interface, the S2 interface, or the OL). The gateway 30 is thus allowed to establish the connection mapping table 341 including the virtual IP header IPa and the outgoing interface of the packet P.

Next, in step S33 of FIG. 3 after the connection mapping table 341 is established by the gateway 30, the gateway 30 returns its "Attach Response" back to the user apparatus 10 via the base station 20, and then the user apparatus 10 appends the virtual IP header IPa received from the gateway 30 to the packet P.

FIGS. 4A to 4C are schematic diagrams depicting the system 1 and a method for Multi-RAT service in accordance with a first embodiment, a second embodiment, and a third embodiment of the present disclosure, respectively, wherein the first user apparatus 10*a* supports Multi-RAT service.

As shown in FIG. 4A and FIGS. 1 to 3, the system 1 and the method for Multi-RAT service in accordance with the present disclosure as described as follows.

(1) The system 1 including a first user apparatus 10*a*, a first base station 20*a* (e.g., a small cell base station), a second base station 20*b* (e.g., an AP base station), a gateway 30 and a core network 40 is provided, and the gateway 30 is located between the first base station 20*a* (the second base station 20*b*) and the core network 40.

(2) During an access process between the first user apparatus 10*a* and the core network 40, the first base station 20*a* (the second base station 20*b*) is allowed to establish a tunnel T between itself and the core network 40, and the gateway 30 is allowed to establish a connection mapping table 341 including a virtual IP header IPa and an outgoing interface of a packet P (see FIG. 3).

(3) The first user apparatus 10*a* is allowed to append the virtual IP header IPa received from the gateway 30 to the packet P, and the packet P is transmitted to the first base station 20*a* (or the second base station 20*b*) via the radio access interface LTE (or Wi-Fi) according to a radio access header IPe (or IPw) of the packet P.

(4) The first base station 20*a* (or the second base station 20*b*) is allowed to append a tunnel header IPte (or IPtw) to the packet P, and the packet P is transmitted to the gateway 30 via the tunnel T of the S1 interface (or the S2 interface) to allow the gateway 30 perform bandwidth aggregation on the packet P.

(5) A determining module 32 of the gateway 30 is allowed to determine whether the packet P contains a virtual IP header IPa. If the determining module 32 determines that the packet P contains a virtual IP header IPa, a processing module 33 of the gateway 30 deletes the virtual IP header IPa, and the gateway 30 finds out that the outgoing interface of the packet P is the S1 interface based on the connection mapping table 341, and transmits the packet P to the core network 40 via the tunnel T of the S1 interface.

Specifically, when the receiving module 31 of the gateway 30 receives the packet P from the first base station 20*a* via the tunnel T of the S1 interface, the processing module 33 of the gateway 30 deletes the virtual IP header IPa from the packet P in order to transmit the packet P to the core network 40 via the tunnel T of the S1 interface.

When the receiving module 31 of the gateway 30 receives the packet P from the second base station 20*b* via the tunnel T of the S2 interface, the processing module 33 of the gateway 30 deletes the virtual IP header IPa from the packet P, and replaces the tunnel header IPtw and the radio access header IPw of the packet P with the tunnel header IPte in order to transmit the packet P to the core network 40 via the tunnel T of the S1 interface.

The second embodiment shown in FIG. 4B differs from the first embodiment shown in FIG. 4A as follows.

The gateway 30 of FIG. 4B finds out that the outgoing interface of the packet P is the S2 interface based on the connection mapping table 341, and transmits the packet P to the core network 40 via the tunnel T of the S2 interface.

Specifically, when the receiving module 31 of the gateway 30 receives the packet P from the second base station 20*b* via the tunnel T of the S2 interface, the processing module 33 of the gateway 30 deletes the virtual IP header IPa from the packet P in order to transmit the packet P to the core network 40 via the tunnel T of the S2 interface.

When the receiving module 31 of the gateway 30 receives the packet P from the first base station 20*a* via the tunnel T of the S1 interface, the processing module 33 of the gateway 30 deletes the virtual IP header IPa from the packet P, and replaces the tunnel header IPte and the radio access header IPe of the packet P with the tunnel header IPtw in order to transmit the packet P to the core network 40 via the tunnel T of the S2 interface.

Third embodiment shown in FIG. 4C differs from the first embodiment shown in FIG. 4A as follows.

The gateway 30 of FIG. 4C finds out that the outgoing interface of the packet P is the offload interface (OL) based on the connection mapping table 341, and transmits the packet P to the intranet/Internet 50 via the OL.

Specifically, when the receiving module 31 of the gateway 30 receives the packet P from the first base station 20*a* via the tunnel T' of the S1 interface; the processing module 33 of the gateway 30 deletes the virtual IP header IPa from the packet P, and replaces the tunnel header IPte and the radio access header IPe of the packet P with an offload header IPa' in order to transmit the packet P to the intranet/Internet 50 via the OL.

When the receiving module 31 of the gateway 30 receives the packet P from the second base station 20b via the tunnel T' of the S2 interface, the processing module 33 of the gateway 30 deletes the virtual IP header IPa from the packet P, and replaces the tunnel header IPtw and the radio access header IPw of the packet P with the offload header IPa' in order to transmit the packet P to the intranet/Internet 50 via the OL.

FIGS. 4D and 4E are schematic diagrams depicting the system 1 and a method for Multi-RAT service in accordance with a fourth embodiment and a fifth embodiment of the present disclosure, respectively, wherein a second user apparatus 10b and a third user apparatus 10c both support Single-RAT service.

As shown in FIG. 4D and FIGS. 1 to 3, the system 1 and the method for Multi-RAT service in accordance with the present disclosure are described as follows.

(1) The system 1 including the second user apparatus 10b, a first base station 20a (e.g., a small cell base station), a gateway 30 and a core network 40 is provided, and the gateway 30 is located between the first base station 20a and the core network 40.

(2) During an access process between the second user apparatus 10b and the core network 40, the first base station 20a is allowed to establish a tunnel T between itself and the core network 40.

(3) The second user apparatus 10b is allowed to transmit a packet P to the first base station 20a via the radio access interface LTE.

(4) The first base station 20a is allowed to append a tunnel header IPte to the packet P, and the packet P is transmitted to the gateway 30 via the tunnel T of the S1 interface.

(5) A determining module 32 of the gateway 30 is allowed to determine whether the packet P contains a virtual IP header IPa. If the determining module 32 determines that the packet P does not contain a virtual IP header IPa, a processing module 33 of the gateway 30 forwards the packet P to the core network 40 via the tunnel T of the S1 interface.

As shown in FIG. 4E and FIGS. 1 to 3, the system 1 and the method for Multi-RAT service in accordance with the present disclosure are described as follows.

(1) The system 1 including the third user apparatus 10c, a second base station 20b (e.g., an AP base station), a gateway 30 and a core network 40 is provided, and the gateway 30 is located between the second base station 20b and the core network 40.

(2) During an access process between the third user apparatus 10c and the core network 40, the second base station 20b is allowed to establish a tunnel T between itself and the core network 40.

(3) The third user apparatus 10c is allowed to transmit a packet P to the second base station 20b via the radio access interface Wi-Fi.

(4) The second base station 20b is allowed to append a tunnel header IPtw to the packet P, and the packet P is transmitted to the gateway 30 via the tunnel T of the S2 interface.

(5) A determining module 32 of the gateway 30 is allowed to determine whether the packet P contains a virtual IP header IPa. If the determining module 32 determines that the packet P does not contain a virtual IP header IPa, a processing module 33 of the gateway 30 forwards the packet P to the core network 40 via the tunnel T of the S1 interface.

In an embodiment, the transmission of a packet P from the core network 40 to the user apparatus 10 can be carried out according to the aforementioned steps, which, however, are executed in a reverse order, and further description of which are omitted.

It is clear from the above that in the gateway, the system and the method for Multi-RAT service in accordance with the present disclosure, a tunnel is established between the base station during the access process between the user apparatus and the core network, and the gateway is used to determine whether a virtual IP header exists. If the gateway determines that the virtual IP header exists (indicating that the packet is from a user apparatus that supports Multi-RAT service), the virtual IP header is deleted from the packet and replaced with a tunnel header, and the packet is transmitted to the core network through the tunnel by the tunnel header. If the gateway determines that no virtual IP header exists (indicating that the packet is from a user apparatus that supports Single-RAT service), the packet will be forwarded to the core network through the tunnel, without the need to activating the gateway to provide additional services.

As a result, the present disclosure allows packets to be transmitted from base stations to a core network by establishing or through one tunnel segment. Therefore, not all packets have to go through two tunnel segments, and in these cases, the gateway does not need to be activated to provide additional services, thereby enhancing the processing performance and transmission speed of packets of the user apparatus.

The above embodiments are only used to illustrate the principles of the present disclosure, and should not be construed as to limit the present disclosure in any way. The above embodiments can be modified by those with ordinary skill in the art without departing from the scope of the present disclosure as defined in the following appended claims.

What is claimed is:

1. A gateway for multiple radio access technology (Multi-RAT) service between base stations and a core network, the gateway comprising:
    a receiving module configured to receive a packet from the base stations or the core network through a tunnel between the base stations and the core network;
    a determining module configured to determine whether a packet from the base stations has a virtual Internet Protocol (IP) header and determine whether a packet to be forwarded to the base stations needs to be appended with a virtual IP header; and
    a processing module configured to:
        delete the virtual IP header from the packet and replace the virtual IP header with a tunnel header when the determining module determines that the packet has a virtual IP header, so as to transmit the packet to the core network through the tunnel by the tunnel header,
        forward the packet to the core network through the tunnel when the determining module determines that the packet has no virtual IP header,
        append a virtual IP header to a packet by searching a connection mapping table when the determining module determines that the packet needs to be appended with the virtual IP header and forward the packet appended with the virtual IP header to the base stations, or
        forward a packet to the base stations when the determining module determines that the packet does not need a virtual IP header to be appended therewith.

2. The gateway of claim 1, further comprising an establishing module configured to establish the connection mapping table containing the virtual IP header and an outgoing interface of the packet to allow the gateway to search the connection mapping table for the outgoing interface of the packet.

3. The gateway of claim 2, wherein when the gateway determines from the connection mapping table that the outgoing interface of the packet is an S1 interface or an S2 interface, the processing module deletes the virtual IP header from the packet and replaces the virtual IP header with the tunnel header, so as to transmit the packet to the core network through the tunnel of the S1 interface or the tunnel of the S2 interface by the tunnel header.

4. A system for multiple radio access technology (Multi-RAT) service, comprising:
   a plurality of base stations;
   a core network; and
   a gateway for Multi-RAT service between the base stations and the core network, the gateway comprising:
      a receiving module configured to receive a packet from the base stations or the core network through a tunnel between the base stations and the core network;
      a determining module configured to determine whether a packet from the base stations has a virtual Internet Protocol (IP) header and determine whether a packet to be forwarded to the base stations needs to be appended with a virtual IP header; and
      a processing module configured to:
         delete the virtual IP header from the packet and replace the virtual IP header with a tunnel header when the determining module determines that the packet has a virtual IP header, so as to transmit the packet to the core network through the tunnel by the tunnel header,
         forward the packet to the core network through the tunnel when the determining module determines that the packet has no virtual IP header,
         append a virtual IP header to a packet by searching a connection mapping table when the determining module determines that the packet needs to be appended with the virtual IP header and forward the packet appended with the virtual IP header to the base stations, or
         forward a packet to the base stations when the determining module determines that the packet does not need a virtual IP header to be appended therewith.

5. The system of claim 4, wherein the gateway further comprising an establishing module configured to establish the connection mapping table containing the virtual IP header and an outgoing interface of the packet to allow the gateway to search the connection mapping table for the outgoing interface of the packet.

6. The system of claim 5, wherein when the gateway determines from the connection mapping table that the outgoing interface of the packet is an S1 interface or an S2 interface, the processing module of the gateway deletes the virtual IP header from the packet and replaces the virtual IP header with the tunnel header, so as to transmit the packet to the core network through the tunnel of the S1 interface or the tunnel of the S2 interface by the tunnel header.

7. The system of claim 4, further comprising a user apparatus for Multi-RAT service configured to transmit the packet to the base stations according to a radio access header of the packet, wherein the base stations then append the tunnel header of an S1 interface or the tunnel header of an S2 interface to the packet.

8. The system of claim 7, wherein the user apparatus requests the gateway to establish a connection mapping table containing the virtual IP header and an outgoing interface of the packet via the base stations, and the gateway responds to the request of the user apparatus via the base stations after the connection mapping table is established.

9. The system of claim 4, further comprising a user apparatus for Single-RAT service configured to transmit the packet to the base stations, wherein the base stations append the tunnel header of an S1 interface or the tunnel header of an S2 interface to the packet.

10. A method for multiple radio access technology (Multi-RAT) service, comprising:
   providing a plurality of base stations, a core network, and a gateway for the Multi-RAT service between the base stations and the core network;
   establishing a tunnel between the base stations and the core network during an access process between a user apparatus and the core network;
   allowing the gateway to receive a packet from the base stations or the core network via the tunnel;
   allowing the gateway to determine whether a packet from the base stations contains a virtual Internet Protocol (IP) header, and determine whether a packet to be forwarded to the base stations needs to be appended with a virtual IP header; and
   deleting, by the gateway, the virtual IP header from the packet and replacing the virtual IP header with a tunnel header when the packet is found to contain a virtual IP header, so as to transmit the packet to the core network through the tunnel by the tunnel header, forwarding, by the gateway, the packet to the core network through the tunnel when the packet is found to contain no virtual IP header, appending, by the gateway, a virtual IP header to a packet by searching a connection mapping table when it is determined that the packet needs to be appended with the virtual IP header and forwarding the packet appended with the virtual IP header to the base stations, or forwarding, by the gateway, a packet to the base stations when it is determined that the packet does not need a virtual IP header to be appended therewith.

11. The method of claim 10, further comprising allowing the gateway to establish the connection mapping table containing the virtual IP header and an outgoing interface of the packet and determine the outgoing interface of the packet from the connection mapping table.

12. The method of claim 11, wherein when the gateway determines from the connection mapping table that the outgoing interface of the packet is an S1 interface or an S2 interface, a processing module of the gateway deletes the virtual IP header from the packet and replaces the virtual IP header with the tunnel header, so as to transmit the packet to the core network through the tunnel of the S1 interface or the tunnel of the S2 interface by the tunnel header.

13. The method of claim 10, further comprising:
   providing a user apparatus for the Multi-RAT service;
   allowing the user apparatus to transmit the packet to the base stations according to a radio access header of the packet; and
   allowing the base stations to append the tunnel header of an S1 interface or the tunnel header of an S2 interface to the packet.

14. The method of claim 13, wherein the user apparatus requests the gateway to establish a connection mapping table containing the virtual IP header and an outgoing interface of the packet via the base stations, and the gateway responds to the request of the user apparatus via the base stations after the connection mapping table is established.

15. The method of claim 10, further comprising:
providing a user apparatus for Single-RAT service;
allowing the user apparatus to transmit the packet to the base stations;
allowing the base stations to append the tunnel header of an S1 interface or the tunnel header of an S2 interface to the packet.

* * * * *